United States Patent
Kim et al.

(10) Patent No.: US 12,209,003 B2
(45) Date of Patent: Jan. 28, 2025

(54) AUTOMATED GUIDED VEHICLE AND METHOD FOR TRANSPORTING ELECTRODE REEL CORE USING THEREOF

(71) Applicant: SAMSUNG SDS CO., LTD., Seoul (KR)

(72) Inventors: Hyeok Soo Kim, Seoul (KR); Se Ho Lee, Seoul (KR); In Sup Um, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 781 days.

(21) Appl. No.: 17/386,619

(22) Filed: Jul. 28, 2021

(65) Prior Publication Data

US 2022/0153562 A1    May 19, 2022

(30) Foreign Application Priority Data

Nov. 16, 2020    (KR) .................. 10-2020-0153047

(51) Int. Cl.
*B66F 9/075* (2006.01)
*B66F 9/06* (2006.01)
*G05D 3/20* (2006.01)

(52) U.S. Cl.
CPC ............ *B66F 9/0755* (2013.01); *B66F 9/063* (2013.01); *G05D 3/20* (2013.01)

(58) Field of Classification Search
CPC .......... B66F 9/0755; B66F 9/18; B66F 9/063; G05D 3/20; G05D 1/661
See application file for complete search history.

(56) References Cited

U.S. PATENT DOCUMENTS 4,138,072 A * 2/1979 Aoyama ............ B65H 67/0411
242/473.4
5,568,720 A * 10/1996 Teich .................. B65H 67/064
242/473.6
(Continued)

FOREIGN PATENT DOCUMENTS

CA        3082510 A1    5/2019
CN        206915209 U    1/2018
(Continued)

OTHER PUBLICATIONS

European Search Report For EP 21187957.2 issued on Jan. 20, 2022 from European patent office in a counterpart European patent application(all the cited references are listed in this IDS).
(Continued)

*Primary Examiner* — Timothy R Waggoner
(74) *Attorney, Agent, or Firm* — Sughrue Mion, PLLC

(57) ABSTRACT

An automated guided vehicle for transporting an object to a facility according to an embodiment of the present disclosure includes a main body, a shaft provided in the main body for guiding movement of the object to the facility and to face a front direction of the main body, a camera provided at one end of the shaft for photographing a front direction of the main body, and a position adjustment module for decoding an identifier when an image photographed by the camera includes the identifier displayed on the facility, and using a result of the decoding to adjust a position, toward which the one end of the shaft is directed.

16 Claims, 15 Drawing Sheets

(56) References Cited

U.S. PATENT DOCUMENTS

| | | | |
|---|---|---|---|
| 5,779,170 A * | 7/1998 | Siepmann | B65H 67/048 |
| | | | 242/534 |
| 7,674,086 B2 * | 3/2010 | Schmidt-Hebbel | B65H 19/12 |
| | | | 414/331.11 |
| 2012/0236141 A1 | 9/2012 | Takagawa | |
| 2018/0319594 A1 * | 11/2018 | Blevins | B66F 9/18 |
| 2020/0125109 A1 | 4/2020 | Velten et al. | |
| 2020/0216264 A1 | 7/2020 | Martinez et al. | |
| 2021/0130123 A1 * | 5/2021 | Kurtz | B66F 9/063 |
| 2021/0261380 A1 * | 8/2021 | Jennings | B65H 16/04 |

FOREIGN PATENT DOCUMENTS

| | | |
|---|---|---|
| CN | 108495798 A | 9/2018 |
| CN | 109081025 A | 12/2018 |
| CN | 209833478 U | 12/2019 |
| CN | 209988781 U | 1/2020 |
| CN | 111792582 A | 10/2020 |
| JP | 3067185 U | 12/1999 |
| JP | 2006-1637 A | 1/2006 |
| JP | 4409552 B2 | 2/2010 |
| JP | 2013-159433 A | 8/2013 |
| JP | 2019-116356 A | 7/2019 |
| JP | 6607177 B2 | 11/2019 |
| JP | 2020-001906 A | 1/2020 |
| KR | 10-2123790 B1 | 6/2020 |
| WO | WO 2012/108114 A1 | 8/2012 |

OTHER PUBLICATIONS

Gunter Ullrich et al., "Automated Guided Vehicle systems: A Primer with Practical Applications" In: "Automated Guided Vehicle systems: A Primer with Practical Applications", Dec. 24, 2014 (Dec. 24, 2014), springer, XP055619722, ISBN: 978-3-662-44813-7.

* cited by examiner

AUTOMATED GUIDED VEHICLE AND METHOD FOR TRANSPORTING ELECTRODE REEL CORE USING THEREOF

This application claims the benefit of Korean Patent Application No. 10-2020-0153047, filed on Nov. 16, 2020, in the Korean Intellectual Property Office, the disclosure of which is incorporated herein by reference in its entirety.

BACKGROUND

1. Field

The invention relates to an automated guided vehicle (AGV). More specifically, it relates to an automated guided vehicle including a position adjustment module for adjusting the position of the shaft provided in the automated guided vehicle.

2. Description of the Related Art

An automated guided vehicle (AGV) is a device that transports goods and is being commercialized in distribution centers, hospitals, airports and marts. The automated guided vehicle is replacing the object transport work previously performed by human workers.

In particular, as mass production is required in accordance with the technology growth in the battery field, a technology for transporting a plurality of electrode reel cores required for a battery production process is required. The prior art related to the transport of the electrode reel core can be described with reference to FIGS. 1 to 3.

Referring to (a) of FIG. 1, a plurality of electrode reel cores 200a, 200b, 200c, 200d (hereinafter, for convenience of description, 200) is loaded on the shaft 10 provided in the bogie 20, and is transported by a manual forklift 30. At this time, the electrode reel core 200 is loaded in the buffer 40 shown in (b) of FIG. 1 before being transported to the facility.

Referring to FIG. 2, the electrode reel core 200 to be transported to the facility is loaded on the manual transport vehicle 50, as shown in (a) of FIG. 2, and the electrode reel core 200 loaded on the manual transport vehicle 50 is loaded in the facility 60, as shown in (b) of FIG. 2, thereby starting the battery production process related to the electrode.

As described with reference to FIGS. 1 to 2, the conventional electrode reel core transporting technology is manually performed by a human operator, thereby consuming excessive manpower. In particular, when the electrode reel core 200 is moved from the bogie 20 to the buffer 40, when the electrode reel core 200 is moved from the buffer 40 to the manual transport vehicle 50, and when the electrode reel core 200 is moved from the manual transport vehicle 50 to the facility 60, a skilled human operator is required so that the electrode reel core 200 does not fall.

Referring to FIG. 3, the movement of the electrode reel core 200 from the buffer 40 to the manual transport vehicle 50 is shown. According to the conventional electrode reel core transporting technology, the human operator 60 manually pushed the electrode reel core 200 loaded in the buffer 40 and loaded it into the manual transport vehicle 50.

In such a conventional technique, there was a problem in that excessive manpower is consumed in the process of transporting the electrode reel core 200 to the facility, and a human operator is injured when the electrode reel core 200 falls due to the heavy weight of the electrode reel core 200.

SUMMARY

The technical problem to be solved by the present invention is to provide an apparatus for logistics automation.

Another technical problem to be solved by the present invention is to provide an apparatus for reducing the transport stage of logistics.

Another technical problem to be solved by the present invention is to provide an apparatus for reducing waste of manpower.

Another technical problem to be solved by the present invention is to provide an apparatus for performing elaborate tasks required when moving logistics.

Another technical problem to be solved by the present invention is to provide an apparatus for aligning a shaft provided in an automated guided vehicle with a corresponding shaft provided in a facility.

The technical problems of the present invention are not limited to the technical problems mentioned above, and other technical problems that are not mentioned will be clearly understood by those skilled in the art from the following description.

According to an automated guided vehicle for transporting an object to a facility comprising, a main body, a shaft provided in the main body for guiding movement of the object to the facility and to face a front direction of the main body, a camera provided at one end of the shaft for photographing a front direction of the main body and a position adjustment module for decoding an identifier when an image photographed by the camera includes the identifier displayed on the facility, and using a result of the decoding to adjust a position, toward which the one end of the shaft is directed.

According to an embodiment, wherein the position adjustment module decodes the identifier to obtain a position, toward which one end of the shaft is directed, and an alignment position of a corresponding shaft, and adjusts a position, toward which one end of the shaft is directed, so that the position, toward which the one end of the shaft is directed, matches the alignment position of the corresponding shaft.

According to an embodiment, wherein the position adjustment module adjusts a position, toward which one end of the shaft is directed, to match the alignment position, fixes a position, toward which one end of the shaft is directed, and increases a height of the other end of the shaft by a reference value.

According to an embodiment, wherein the position adjustment module adjusts a position, toward which one end of the shaft is directed, to match the alignment position, fixes a position, toward which one end of the shaft is directed, and decreases a height of the other end of the shaft by a reference value.

According to an embodiment, the automated guided vehicle further includes a pusher for pushing the object to move to the facility.

According to an embodiment, wherein the pusher pushes the object loaded on the shaft to move to the facility when a position, toward which the one end of the shaft is directed, is adjusted by the position adjustment module.

According to an embodiment, wherein the pusher pushes a loaded first object to move a second object to a first facility, and stops pushing the first object when the movement of the second object to the first facility is completed.

According to an embodiment, wherein the shaft includes a first loading unit for loading a first object and a second loading unit for loading a second object.

According to an embodiment, wherein the second object is loaded on the second loading unit after the first object is loaded on the first loading unit.

According to an embodiment, the automated guided vehicle further includes a fixing unit for preventing the object from falling when the object is transported.

According to an embodiment, wherein the shaft includes a first loading unit for loading a first object and a second loading unit for loading a second object, wherein the fixing unit includes a first fixing unit for fixing the first object loaded on the first loading unit and a second fixing unit for fixing the second object loaded on the second loading unit.

According to an embodiment, wherein the first fixing unit fixes the first object by combining with a fixing groove formed in the first object when the first object is loaded on the first loading unit.

According to an embodiment, wherein the second fixing unit fixes the second object by combining with one end of the shaft when the second object is loaded on the second loading unit.

According to an embodiment, the automated guided vehicle further includes a sensor for detecting the number of objects loaded on the shaft.

According to an embodiment, wherein a transport speed of the automated guided vehicle is decreased if the number of the objects is greater than or equal to a reference value, wherein a transport speed of the automated guided vehicle is increased if the number of the objects is less than a reference value.

According to an embodiment, the automated guided vehicle further includes a pusher for pushing the object to move to the facility, wherein an operation of the pusher is controlled to correspond to the number of the objects.

According to an embodiment, wherein the facility includes a first corresponding shaft and a second corresponding shaft having a height different from that of the first corresponding shaft and a height adjustment module for adjusting a height of the shaft according to a height of the first corresponding shaft and a height of the second corresponding shaft.

According to an embodiment, wherein the height adjustment module previously stores a height of the first corresponding shaft and a height of the second corresponding shaft.

According to an embodiment, wherein the shaft includes, a first shaft provided in the main body to face a front direction of the main body and a second shaft provided in the main body to face a rear direction of the main body.

According to another aspect of present disclosure, a method performed by a computing device for adjusting a shaft of an automated guided vehicle including, receiving an image photographed by a camera provided at one end of a shaft included in an automated guided vehicle, decoding an identifier when the image includes the identifier and adjusting a position, toward which one end of the shaft is directed, by using a result of the decoding.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
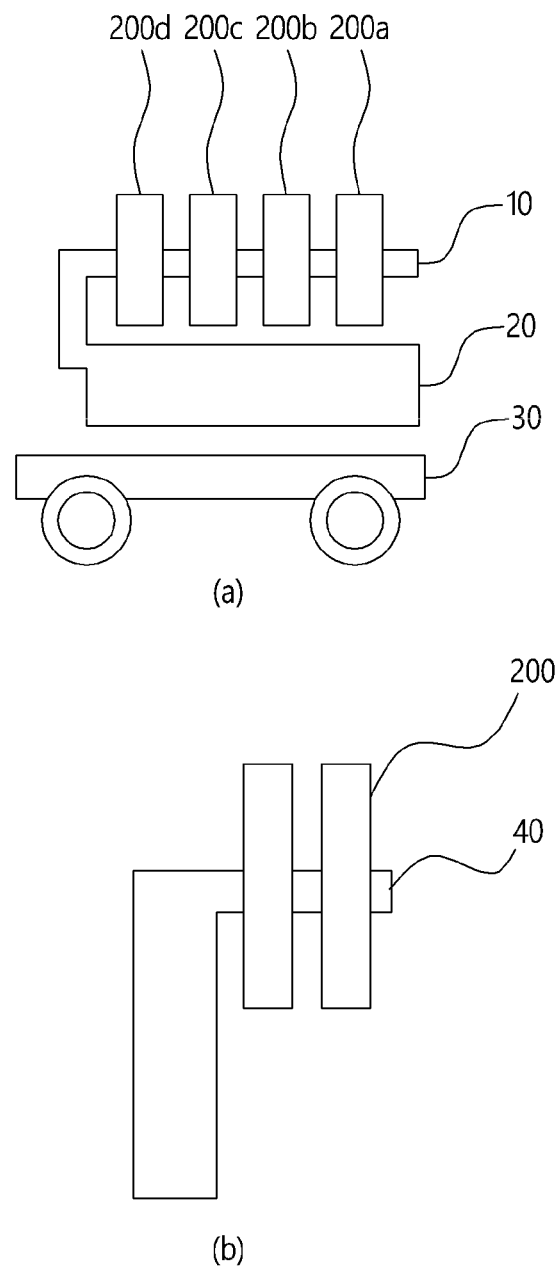
FIGS. 1 to 3 are views for describing a conventional electrode reel core transporting technology.
Figure 2:
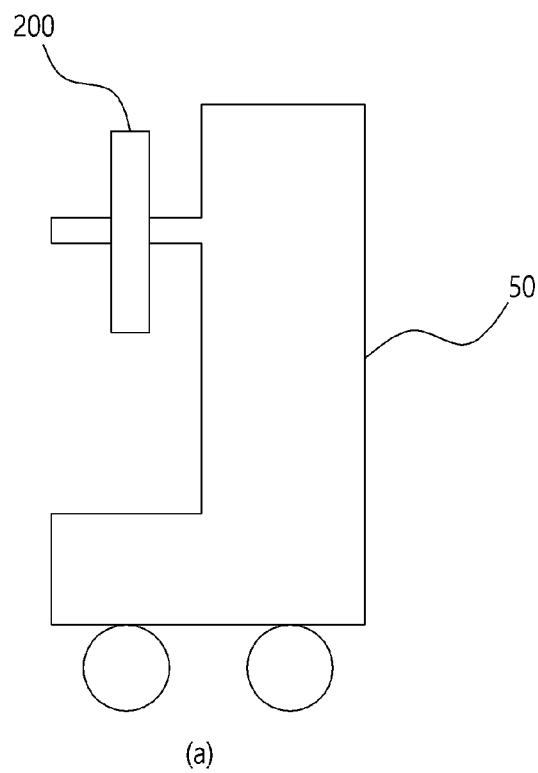
Figure 2:
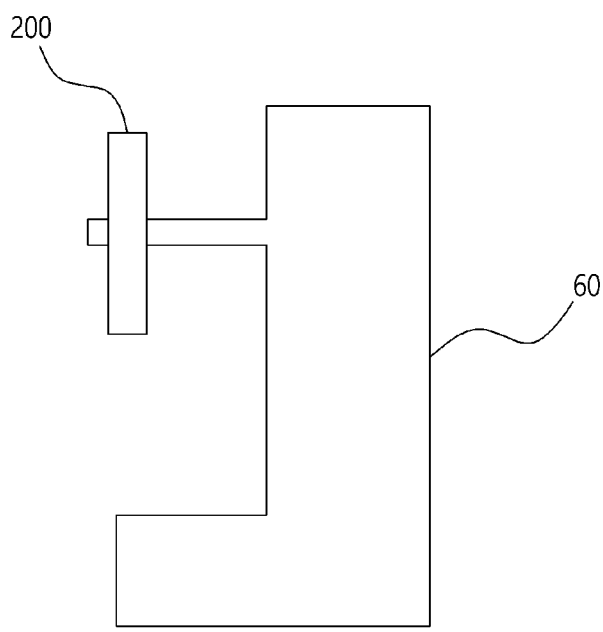

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present inventive concept, when it is determined that the detailed description of the related well-known configuration or function may obscure the gist of the present inventive concept, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the invention. In this specification, the singular also includes the plural unless specifically stated otherwise in the phrase.

In addition, in describing the component of this invention, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, some embodiments of the present inventive concept will be described in detail with reference to the accompanying drawings.

Figure 4:
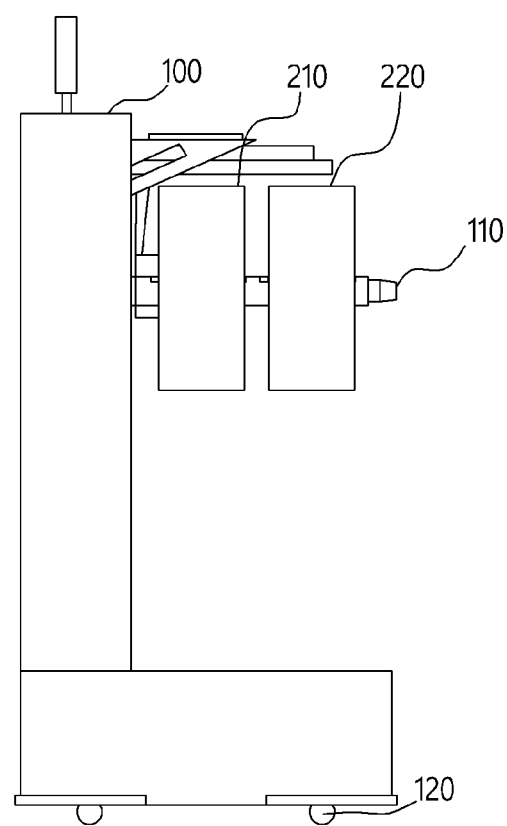
FIG. 4 is a side view of an automated guided vehicle according to an embodiment of the present invention.

Hereinafter, an automated guided vehicle according to an embodiment of the present invention will be described with reference to FIG. 4. FIG. 4 is a side view of an automated guided vehicle according to an embodiment of the present invention.

Referring to FIG. 4, an automated guided vehicle is shown. The automated guided vehicle may include a main body 100, a shaft 110 and a moving unit 120. Hereinafter, each configuration will be described in more detail.

The main body 100 refers to the body of an automated guided vehicle. The shaft 110 and the moving unit 120 to be described later may be provided in the main body 100.

Next, the shaft 110 refers to a configuration in the shape of a round bar provided in the main body so as to face the front direction of the main body 100. However, in the present invention, the shaft 110 is not limited to a round bar in shape, and may be changed to be suitable for an object to be loaded on the shaft. That is, all shapes, in which an object can be loaded, may be included in the shape of the shaft 110.

Here, an object means anything transported by an automated guided vehicle. In particular, it may mean an electrode reel core required for battery production.

In addition, the shaft 110 may guide the movement of the object to the facility. More specifically, the object may be loaded on the shaft 110 and transported to the facility. Here, the shaft 110 may be provided in the main body 110 so as to load a weight equal to or greater than the reference value. By making it possible to load a weight equal to or greater than the reference value, it is possible to load an object with heavy weight.

In addition, the shaft 110 may load a plurality of objects. For example, the first object 210 may be loaded first and the second object 220 may be loaded after the first object 210 is loaded. A more detailed description related to the shaft 110 described above will be described in detail later with reference to FIGS. 6 to 8.

Next, the moving unit 120 refers to a wheel provided for moving the automated guided vehicle. In order to transport the objects loaded in the automated guided vehicle, the moving unit 120 may be movable forward, backward, left and right. Since the automated guided vehicle can move forward, backward, left and right by the moving unit 120, correction can be performed even if an error occurs between the target position and the arrival position when reaching the destination. Here, position correction may be performed so that the error becomes less than or equal to the reference value.

Further, the moving unit 120 may include a plurality of wheels. By including a plurality of wheels in the moving unit 120, the automated guided vehicle can move more stably.

In FIG. 4, only the components related to the embodiment of the present invention are shown. Accordingly, those of ordinary skill in the art to which the present invention pertains can recognize that other general purpose components may be further included in addition to the components illustrated in FIG. 4.

Since the automated guided vehicle described with reference to FIG. 4 includes a main body 100, a shaft 110, and a moving unit 120, it may load an object on the shaft 110 to transport the object without human assistance.

In the present invention, the automated guided vehicle may be a device that transports an object along a preset path. In addition, the automated guided vehicle may be a device that dynamically transports objects according to a predetermined rule. All known techniques related to an automated guided vehicle (AGV) can be applied to the present invention. Hereinafter, an automated guided vehicle according to an embodiment of the present invention will be described in more detail with reference to FIG. 5.

Figure 5:
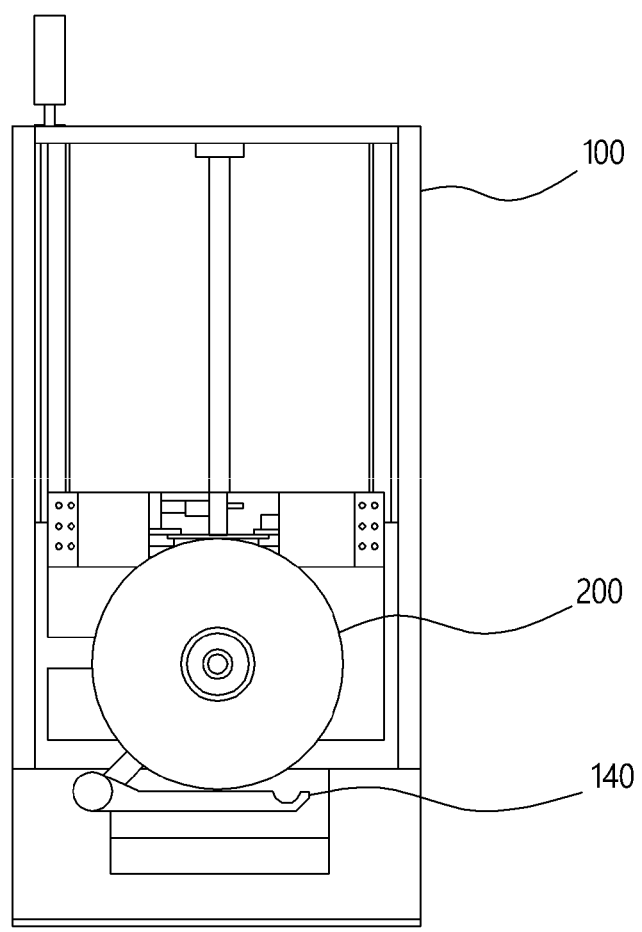
FIG. 5 is a front view of the automated guided vehicle described with reference to FIG. 4.

FIG. 5 is a front view of the automated guided vehicle described with reference to FIG. 4.

In some embodiments, the automated guided vehicle may further include a fixing unit that prevents the object from falling when transporting the object 200. Referring to FIG. 5, a second fixing unit 140 is shown. Here, the second fixing unit 140 means fixing the object by combining with one end of the shaft. A more detailed description of the fixing unit, the first fixing unit, and the second fixing unit will be described in more detail with reference to FIGS. 10 to 11 later.

Figure 6:
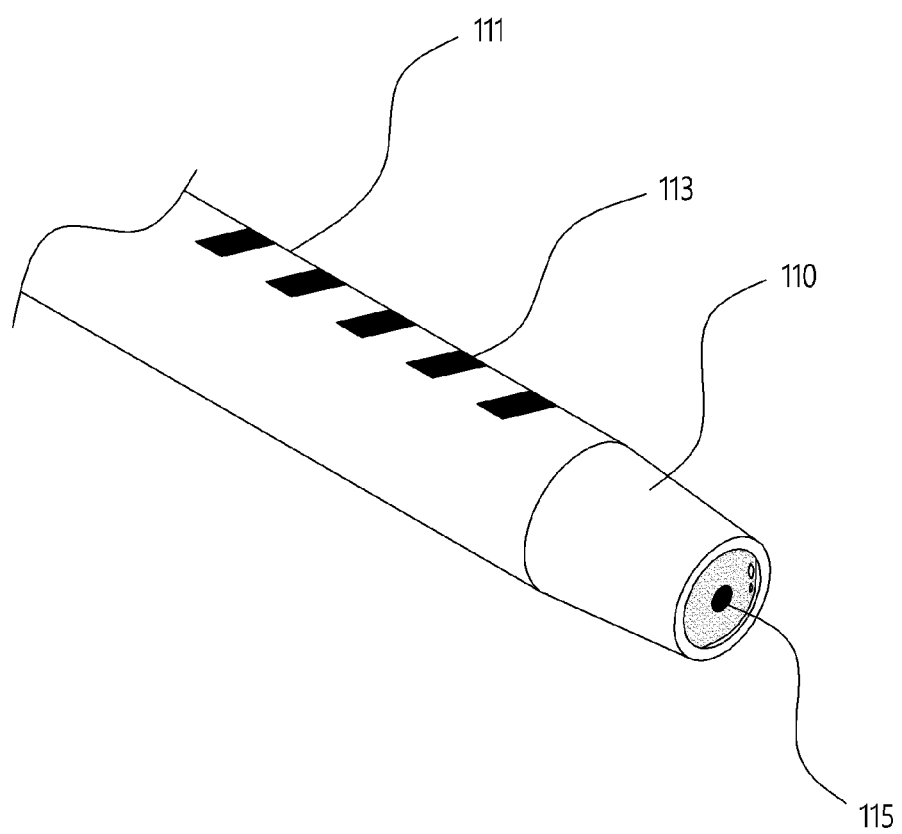
FIG. 6 is a view for describing in more detail the shaft of the automated guided vehicle described with reference to FIG. 4.

Hereinafter, the shaft of the automated guided vehicle and the operation performed by the shaft will be described in more detail with reference to FIGS. 6 to 8. FIG. 6 is a view for describing in more detail the shaft of the automated guided vehicle described with reference to FIG. 4.

Referring to FIG. 6, the shaft 110 is shown in more detail.

In some embodiments, the shaft 110 may include a first loading unit 111, on which a first object is loaded, and a second loading unit 113, on which a second object is loaded. As described above, a plurality of objects may be loaded on the shaft 110. As the shaft 110 loads a plurality of objects, the object transport of the automated guided vehicle can be performed more efficiently.

Here, the second object may be one that is loaded on the second loading unit 113 after the first object is loaded on the first loading unit 111. Objects loaded first according to the order can be loaded sequentially from the end of the shaft to the inside.

In addition, in some embodiments, the automated guided vehicle may include a camera 115 provided at one end of the shaft 110 for photographing the front direction of the main body. Here, an identifier displayed on a facility to be described later may be photographed by the camera 115.

Hereinafter, the operation performed by the shaft will be described in more detail with reference to FIGS. 7 to 8.

Figure 3:
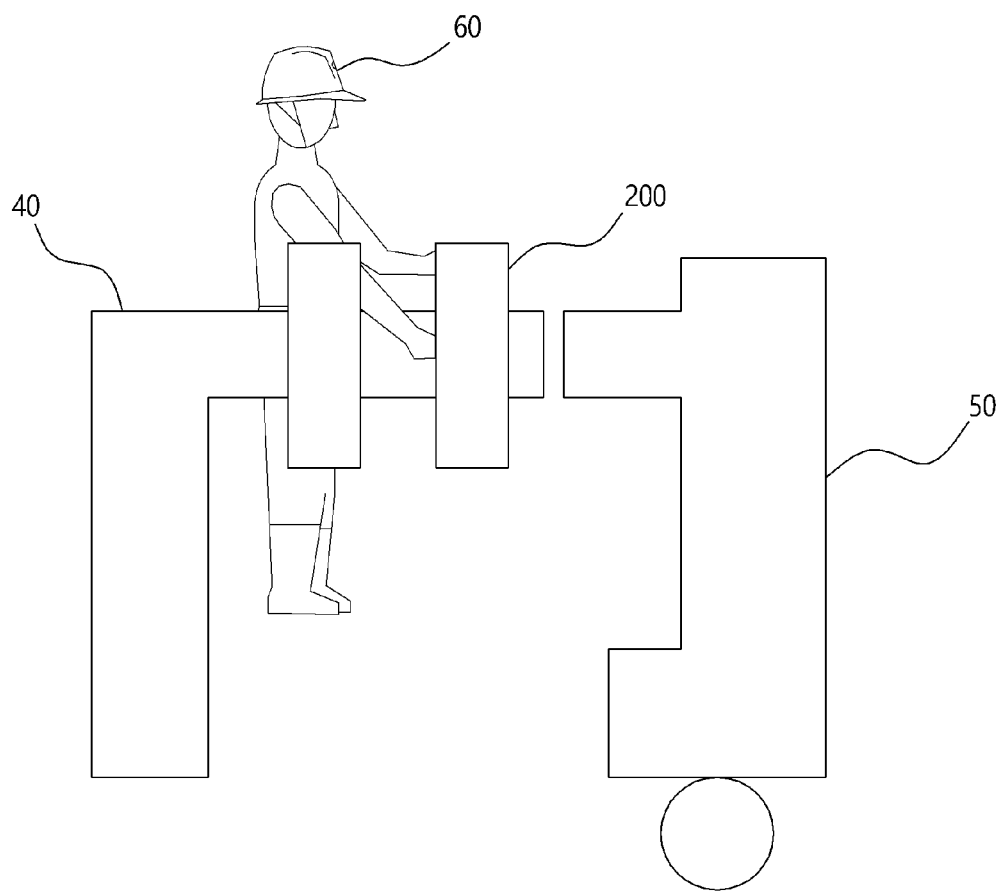

As described above with reference to FIG. 4, position correction may be performed by the moving unit 120 included in the automated guided vehicle. However, even if the position correction of the automated guided vehicle is performed, as described with reference to FIG. 3, the correction may not be sufficiently made to perform an elaborate operation of moving the object 200 between equipment.

Figure 7:
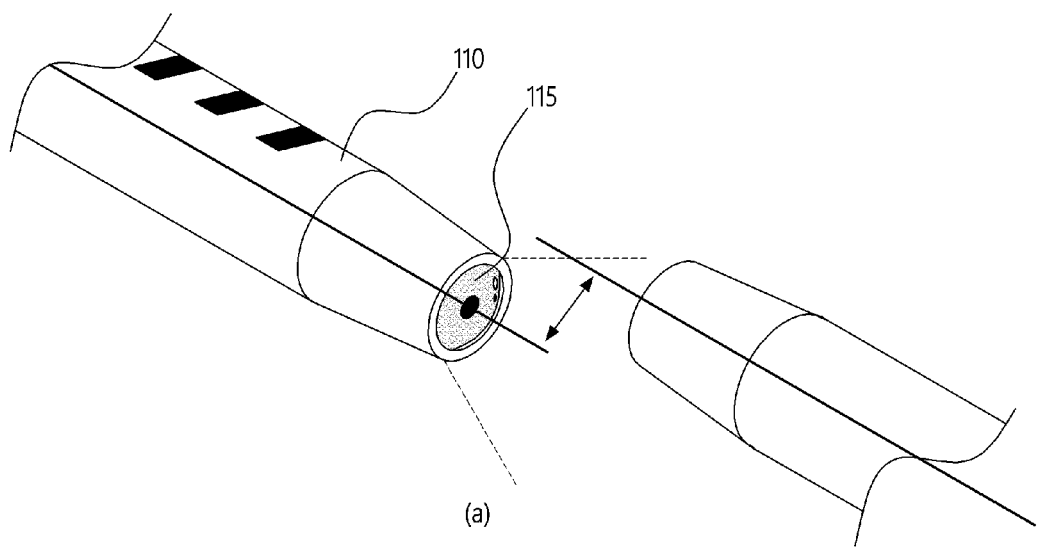
FIGS. 7 to 8 are exemplary views for describing the operation of the shaft of the automated guided vehicle described with reference to FIG. 6 in more detail.
Figure 7:
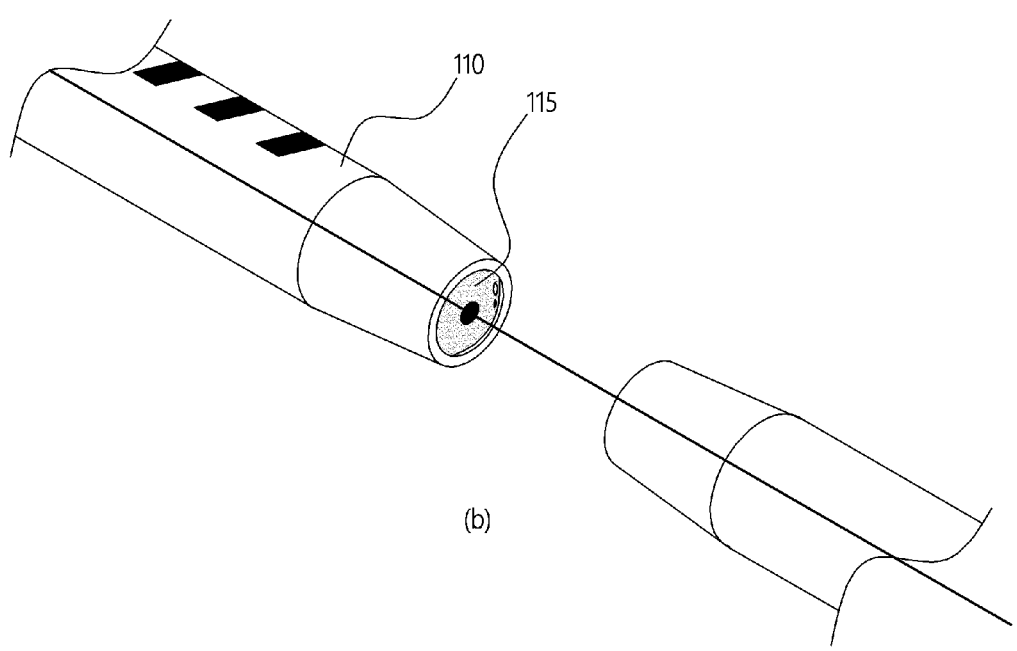

Referring to (a) of FIG. 7, the shaft 110 and the corresponding shaft provided in the facility are shown to be spaced apart. Although the shaft 110 and the corresponding shaft should be aligned in order to move the object 200 between equipment, as described above, sufficient correction may not be made.

Referring to (b) of FIG. 7, likewise, the shaft 110 and the corresponding shaft provided in the facility are shown to be spaced apart. However, (b) of FIG. 7 shows that the shaft 110 and the corresponding shaft are aligned. The position of the shaft 110 may be adjusted to move the object between equipment. The position adjustment of the shaft 110 may be performed in a position adjustment module included in the automated guided vehicle. Hereinafter, the position adjustment module will be described in more detail.

In some embodiments, the automated guided vehicle may include a position adjustment module. Here, when the image photographed by the camera includes the identifier displayed on the facility, the position adjustment module may decode the identifier and adjust the position, toward which one end of the shaft is directed, using the result of the decoding.

Here, the identifier means a Data Matrix, which is a type of 2D barcode. When the Data Matrix is decoded, the position, toward which the camera provided at one end of the shaft is directed, that is, the position, toward which one end of the shaft is directed, can be obtained. Further, it is also possible to obtain a position, at which one end of the shaft should be aligned, for example, the alignment position of the corresponding shaft of the facility. In this case, the alignment position of the corresponding shaft may be previously determined and encoded. However, the identifier of the present invention is not limited to the Data Matrix, and all marks that enable identification of location information photographed by the camera, such as barcodes and QR barcodes, may be included in the identifier. Hereinafter, an operation performed by the shaft will be described in more detail with reference to FIG. 8.

Figure 8:
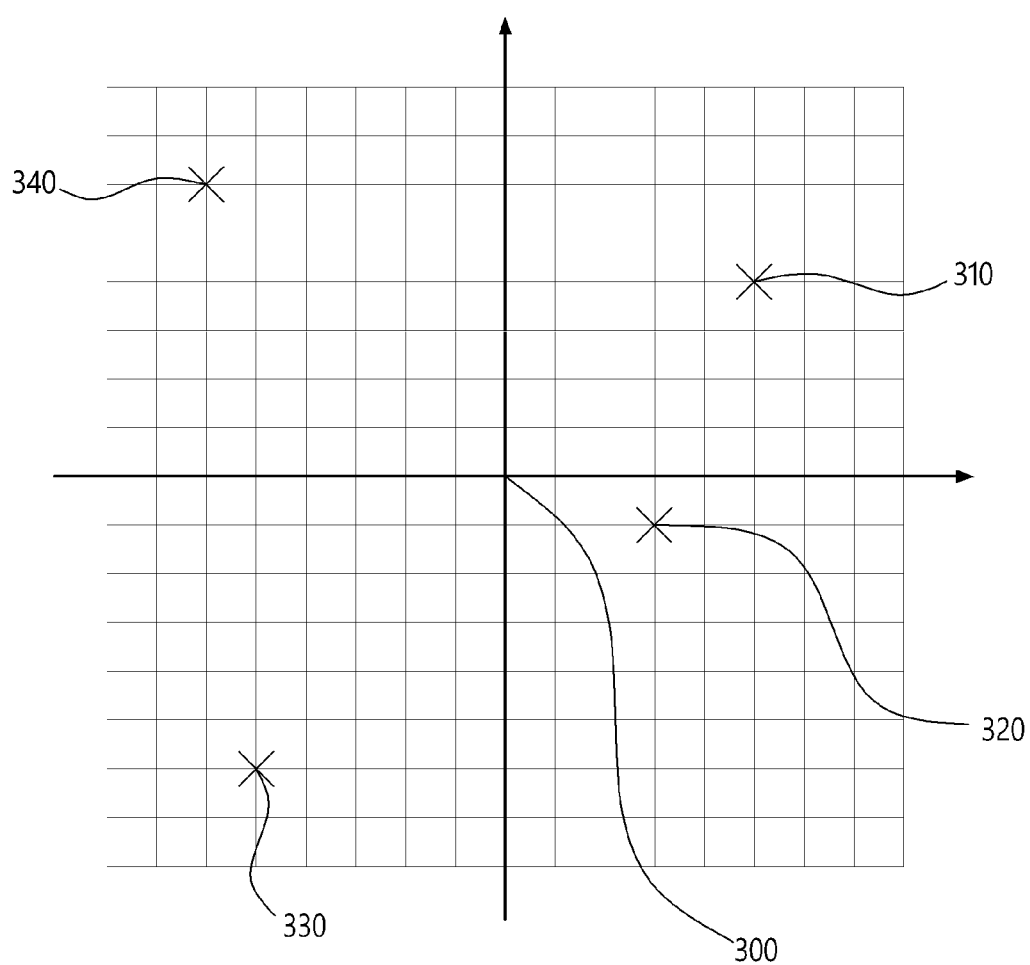

Referring to FIG. 8, a position coordinate system is shown. Here, the position coordinate system is exemplary for describing the position adjustment of the shaft, and does not limit the scope of the present invention. Referring to the position coordinate system illustrated in FIG. 8, the (0, 0) origin is the alignment position 300 of the corresponding shaft. At this time, four examples, toward which one end of the shaft is directed, are shown in the position coordinate system.

In some embodiments, the position adjustment module decodes the identifier to obtain a position, toward which one end of the shaft is directed, and an alignment position of the corresponding shaft, and may adjust the position, toward which one end of the shaft is directed, so that the position, toward which the end of the shaft is directed, matches the alignment position of the corresponding shaft.

In the first shaft position 310, a position, toward which one end of the shaft is directed, is displayed in a coordinate system. The first shaft position 310 is (5, 4) and the position, at which one end of the shaft is directed, may be moved by 5 to the left and 4 to the bottom so as to match the alignment position (0, 0). Here, the reference unit of movement may be a value preset by the user. For example, 1 mm may be a reference unit. At this time, the position, toward which one end of the shaft is directed, may be moved by 5 mm to the left and 4 mm to the bottom. However, the present invention is not limited to this example.

The second shaft position 320 is (3, −1) and the position, toward which the one end of the shaft is directed, may be moved by 3 to the left and 1 to the top so as to match the alignment position (0, 0). The third shaft position 330 is (−5, −6) and the position, toward which the one end of the shaft is directed, may be moved by 5 to the right and 6 to the top so as to match the alignment position (0, 0). The fourth shaft position 340 is (−6, 6) and the position, toward which the one end of the shaft is directed, may be moved by 6 to the right and 6 to the bottom so as to match the alignment position (0, 0). However, the present invention is not limited to a position, toward which one end of the shaft is directed, as illustrated in FIG. 8.

According to the present embodiment described with reference to FIGS. 7 to 8, by providing a position adjustment module for adjusting the position, toward which the one end of the shaft is directed, in the automated guided vehicle, movement of an object requiring elaborate alignment can be performed. Object transport can be automated without consuming excessive manpower by skilled workers.

In some embodiments, the position adjustment module may adjust a position, toward which one end of the shaft is directed, to match the alignment position, and fix a position, toward which one end of the shaft is directed, but increase the height of the other end of the shaft by a reference value. Also, on the contrary, the height of the other end of the shaft may be decreased by a reference value. By increasing or decreasing the height of the other end of the shaft by a reference value, a certain angle is formed between the shaft and the corresponding shaft, so that the object can be moved more easily when the object is moved.

More specifically, when the object is loaded on the automated guided vehicle, the height of the other end of the shaft is decreased by a reference value, so that the object can be moved to the shaft more easily. In addition, when the object is moved from the automated guided vehicle to the corresponding shaft of the facility, the height of the other end of the shaft is increased by a reference value, so that the object can be moved more easily from the shaft to the corresponding shaft. Hereinafter, a pusher of an automated guided vehicle will be described with reference to FIG. 9.

Figure 9:
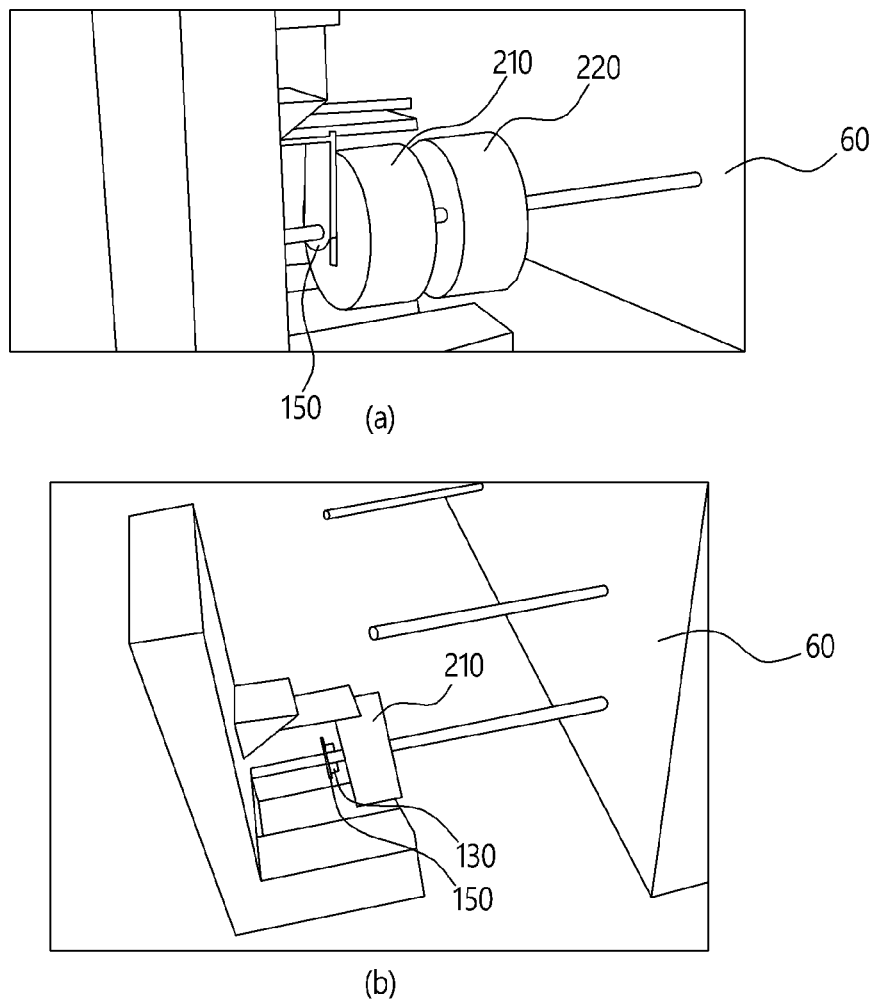
FIG. 9 is a view for describing in more detail the pusher of the automated guided vehicle described with reference to FIG. 4.

FIG. 9 is a view for describing in more detail the pusher of the automated guided vehicle described with reference to FIG. 4.

In some embodiments, the automated guided vehicle may further include a pusher 150 that pushes an object loaded on the automated guided vehicle and moves it to the facility. The shaft and the corresponding shaft of the facility are aligned by the position adjustment module described above, and the pusher 150 pushes the object so that the object can be moved to the corresponding shaft of the facility. Referring to (a) of FIG. 9, the first object 210 and the second object 220 are pushed and moved in the direction of the facility by the pusher 150.

Here, the pusher 150 first pushes the loaded first object 210 to move the second object 220 to the corresponding shaft of the first facility, and when the movement of the second object 220 is completed, the operation of pushing the first object 210 may be stopped. In this case, whether or not the movement of the second object 220 is completed may use a result detected by a sensor to be described later. Also, the movement range of the pusher 150 for completing movement of the second object 220 may be previously determined.

According to this embodiment, the object loaded on the shaft can be moved by the pusher 150 to the destination (for example, the corresponding shaft of the facility) without the human operator performing the work. In addition, when the movement of the second object 220 is completed, a plurality of objects may be moved to different destinations by stopping the operation of the pusher 150 pushing the first object. For example, the second object 220 may be moved to the corresponding shaft of the first facility, and the first object 210 may be moved to the corresponding shaft of the second facility. Hereinafter, a fixing unit of the automated guided vehicle will be described in detail with reference to FIGS. 10 to 11.

Figure 10:
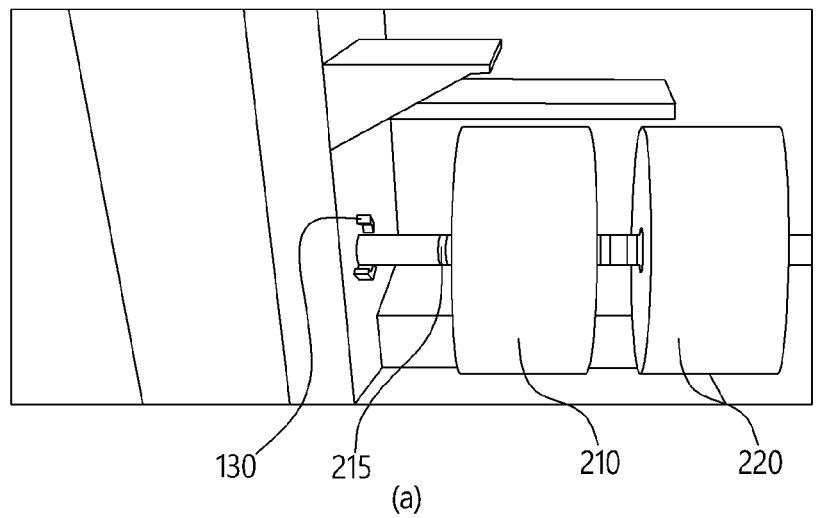
FIGS. 10 and 11 are views for describing in more detail the fixing unit of the automated guided vehicle described with reference to FIG. 4.
Figure 10:
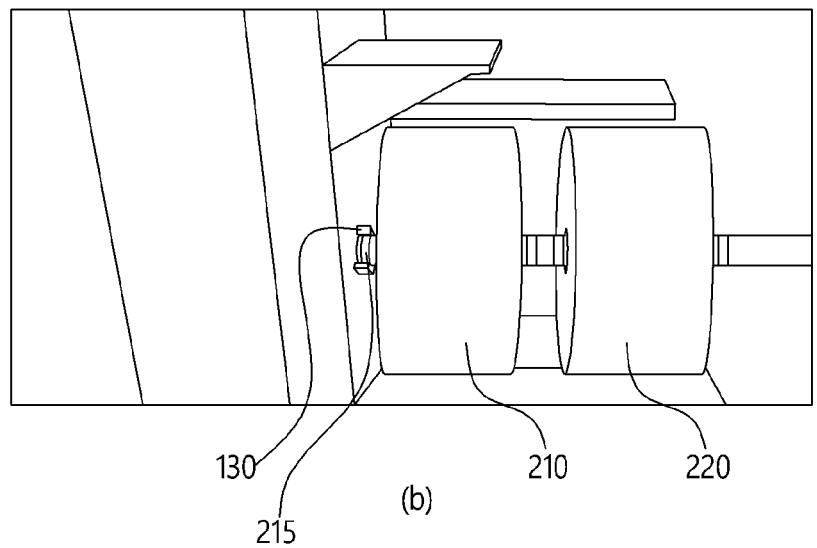
Figure 11:
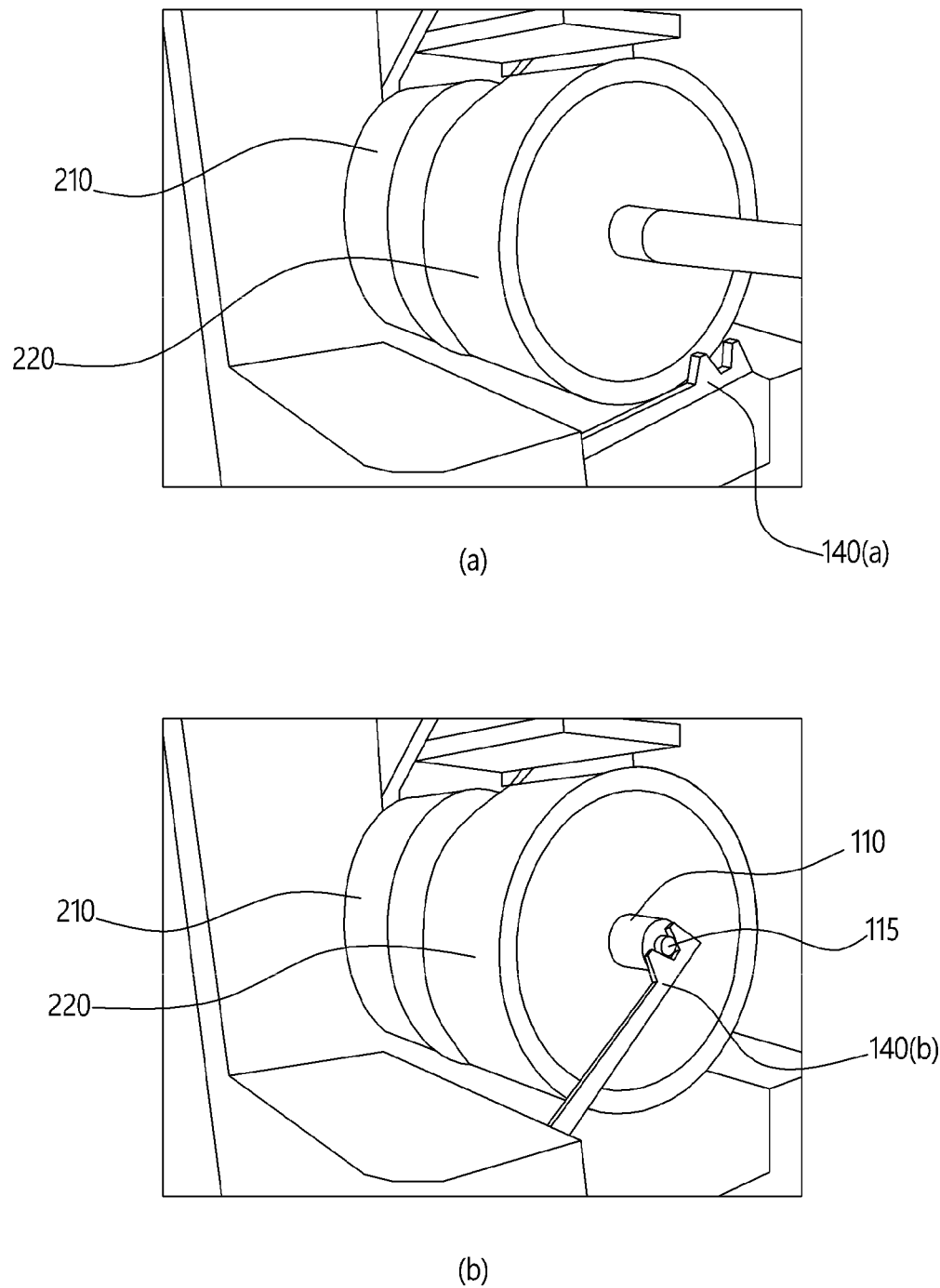

FIGS. 10 and 11 are views for describing in more detail the fixing unit of the automated guided vehicle described with reference to FIG. 4.

In some embodiments, the automated guided vehicle may include a fixing unit. Here, the fixing unit may include a first fixing unit 130 for fixing a first object loaded on the first loading unit of the shaft and a second fixing unit 140 for fixing a second object loaded on the second loading unit.

Referring to FIG. 10, a process, in which the first object 210 and the second object 220 are loaded on the shaft, is illustrated. Here, the operation of the first fixing unit 130 fixing the first object 210 is illustrated in detail.

Referring to (a) of FIG. 10, the first object 210 and the second object 220 are loaded on the shaft. Here, the object may have fixing grooves 215 formed on both side surfaces thereof. At this time, when the first object 210 is loaded on the first loading unit, the first fixing unit 130 may be combined with the fixing groove 215 formed in the first object 210 to fix the first object 210. The first fixing unit 130 combined with the fixing groove 215 may be seen with reference to (b) of FIG. 10. For example, the first fixing unit 130 may mean a clamp. That is, the first fixing unit 130 may be fixing the fixing groove 215 formed on the first object 210 so that it cannot be moved. However, the present invention is not limited to the illustrated clamp, and all known configurations for fixing the object by combining with the fixing groove formed on the side surface of the object may be included in the present invention.

Next, referring to FIG. 11, a process, in which the first object 210 and the second object 220 are loaded on the shaft, is illustrated in a direction different from that of FIG. 10. Here, the operation of the second fixing unit 140 fixing the second object 220 is illustrated in detail.

Referring to (a) of FIG. 11, the second object 220 is loaded on the shaft. Here, the second fixing unit 140 is located at the lowermost end 140(*a*). In this case, when the second object 220 is loaded on the second loading unit, the second fixing unit 140 is combined with one end of the shaft to fix the second object 220. Referring to (b) of FIG. 11, the second fixing unit located at the lowermost end 140(*a*) moves and is combined with the shaft. Since the second fixing unit 140 is located at the combining position 140(*b*), it is possible to prevent the second object 220 from being separated. Hereinafter, a height adjustment module of the automated guided vehicle will be described with reference to FIG. 12.

Figure 12:
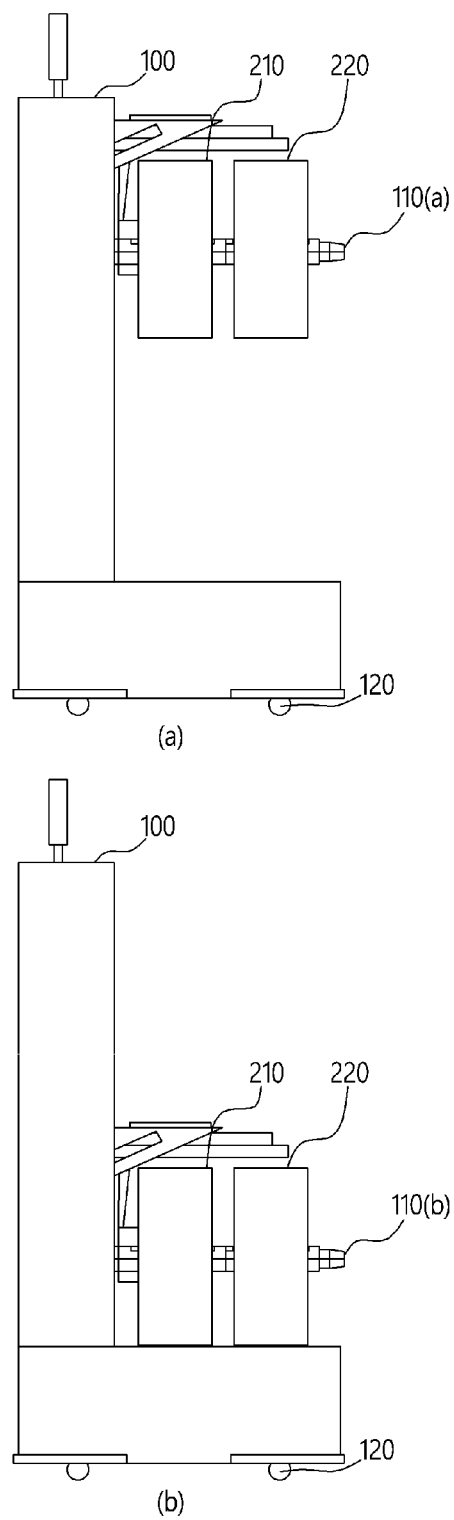
FIG. 12 is a view for describing in more detail the height adjustment module of the automated guided vehicle described with reference to FIG. 4.

FIG. 12 is a view for describing in more detail the height adjustment module of the automated guided vehicle described with reference to FIG. 4.

In some embodiments, each facility may have corresponding shafts of various heights. In this case, the automated guided vehicle may include a height adjustment module that adjusts the height of the shaft according to the height of the corresponding shaft. Here, the height of the corresponding shaft may be previously stored. However, the present invention is not limited thereto, and the height of the corresponding shaft may be dynamically measured by a sensor for detecting the height of the corresponding shaft.

Referring to (a) of FIG. 12, the shaft 110 is located at the uppermost height 110(*a*), and referring to (b) FIG. 12, the shaft 110 is located at the lowermost height 110(*b*). The shaft 110 may be adjusted to a height between the uppermost height 110(*a*) and the lowermost height 110(*b*) by the height adjustment module.

According to the present embodiment, the height of the shaft is adjusted by the height adjustment module according to the height of the corresponding shaft, so that the object can be automatically transported without consuming human resources. Even in a facility, in which a plurality of corresponding shafts having different heights exist, the automated guided vehicle according to the present embodiment can be operated to transport objects. Hereinafter, an automated guided vehicle according to another embodiment of the present invention will be described with reference to FIG. 13.

Figure 13:
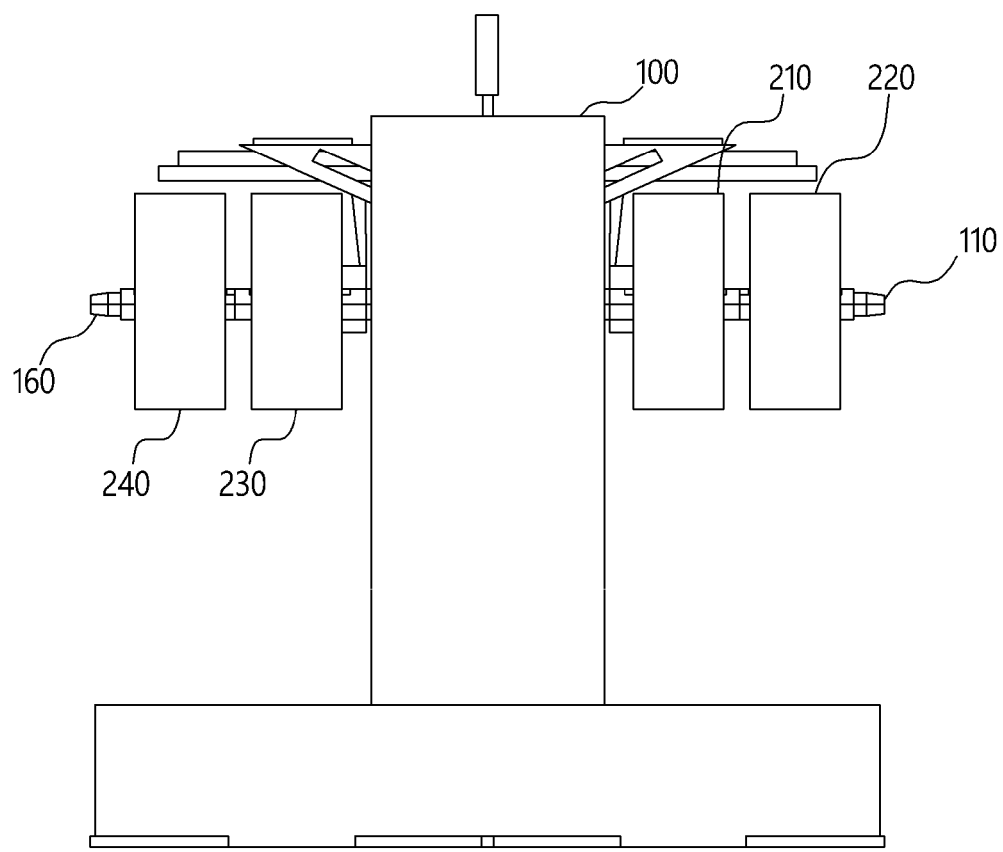
FIG. 13 is a side view of an automated guided vehicle according to another embodiment of the present invention.

FIG. 13 is a side view of an automated guided vehicle according to another embodiment of the present invention.

In some embodiments, the shaft may include a first shaft provided in the main body to face a front direction of the main body and a second shaft provided in the main body to face a rear direction of the main body.

Referring to FIG. 13, in addition to the shaft 110 provided to face the front direction of the main body, a second shaft 160 is provided to face the rear direction of the main body. The first object 210 and the second object 220 are loaded on the shaft 110, and the third object 230 and the fourth object 240 are loaded on the second shaft 160.

According to this embodiment, the number of objects to be loaded can be increased. Further, it is not limited to the first shaft and the second shaft, and a shaft may be further provided in all directions of the main body including a lateral direction.

The automated guided vehicle according to an embodiment of the present invention may further include a sensor for detecting the number of objects loaded on the shaft. At this time, if the number of objects is greater than or equal to the reference value, the transport speed of the automated guided vehicle may be decreased, and if the number of objects is less than the reference value, the transport speed of the automated guided vehicle may be increased. According to the present embodiment, by adjusting the transport speed of the automated guided vehicle according to the number of objects transported by the automated guided vehicle, it is possible to implement a safer and more efficient logistics environment.

Further, in addition to a sensor for detecting the number of objects loaded on the shaft, a pusher for pushing the object to move to the facility may be further included. In this case, an operation of the pusher may be controlled to correspond to the number of objects. For a more specific example, when the number of objects loaded on the shaft calculated using the information sensed by the sensor is one, the pusher operates to move one object to the facility. In addition, if the number of loaded objects is two, the pusher operates to move both two objects to the facility. According to the present embodiment, the automated guided vehicle can be more efficiently operated by varying the output of the pushing force of the pusher according to the number of objects loaded on the shaft.

In addition, by providing a sensor for sensing the number of objects loaded on the shaft, it is possible to additionally include a module that verifies whether or not a predetermined object transportation is performed well. For a more specific example, when the path of the automated guided vehicle is previously determined so that the second object moves to the first facility and the first object moves to the second facility, if the number of objects loaded on the shaft is calculated as one, it can be determined that an error has occurred in the transport of the automated guided vehicle. According to the present embodiment, it is possible to check whether or not the object is transported smoothly by the automated guided vehicle by the sensor and the verification module.

Until now, an automated guided vehicle according to some embodiments of the present invention has been described with reference to FIGS. 1 to 13. Hereinafter, a method of transporting an object using an automated guided vehicle according to another embodiment of the present invention will be described with reference to FIG. 14. FIG.

14 is a flowchart of an object transporting method using an automated guided vehicle according to another embodiment of the present invention.

The object transporting method according to the present embodiment may be performed by a computing device (e.g., a position adjustment module). In addition, the method according to the present embodiment may be performed by being divided by the first computing device and the second computing device. Hereinafter, in performing each operation of the method according to the present embodiment, if the description of the subject is omitted, the subject may be interpreted as being the computing device.

Figure 14:
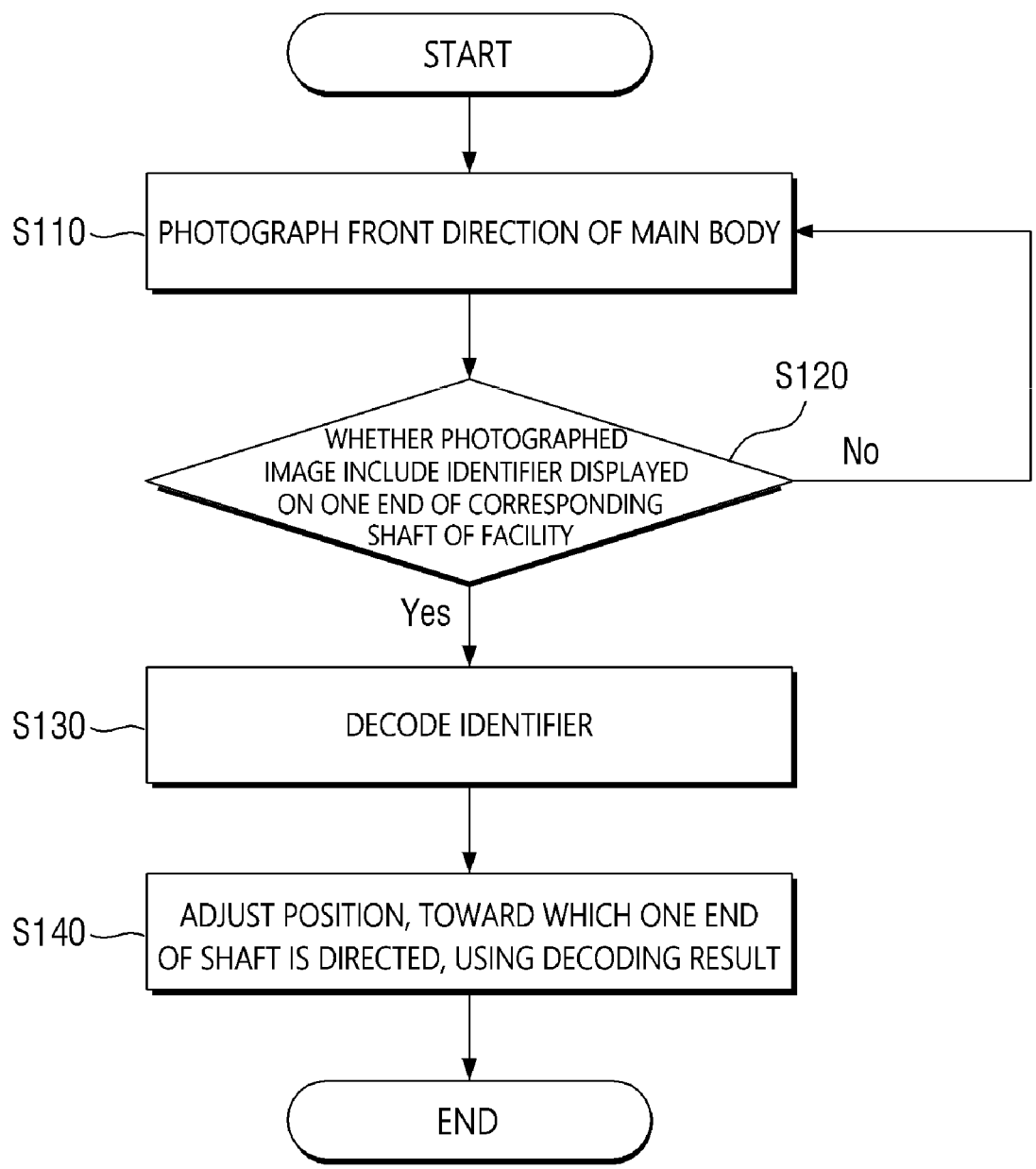
FIG. 14 is a flowchart of an object transporting method using an automated guided vehicle according to another embodiment of the present invention.

Referring to FIG. 14, an image, in which the front direction of the main body is photographed, is obtained (S110). Next, when the photographed image includes the identifier displayed on the facility (S12), the identifier is decoded (S130). Next, a signal for adjusting the position, toward which one end of the shaft is directed, is output using the result of decoding the identifier (S140). The step described with reference to FIG. 14 may mean a step performed in the position adjustment module described with reference to FIGS. 7 to 8 above. A more detailed description of the steps described with reference to FIG. 14 may be embodied with reference to FIGS. 7 to 8.

Up to now, with reference to FIGS. 1 to 14, an automated guided vehicle and an application field thereof according to some embodiments of the present invention have been described. Hereinafter, an exemplary computing device 1500 capable of implementing some configurations of an automated guided vehicle according to an embodiment of the present invention will be described.

Hereinafter, an exemplary computing device 1500 that can implement an apparatus and a system, according to various embodiments of the present disclosure will be described with reference to FIG. 15.

Figure 15:
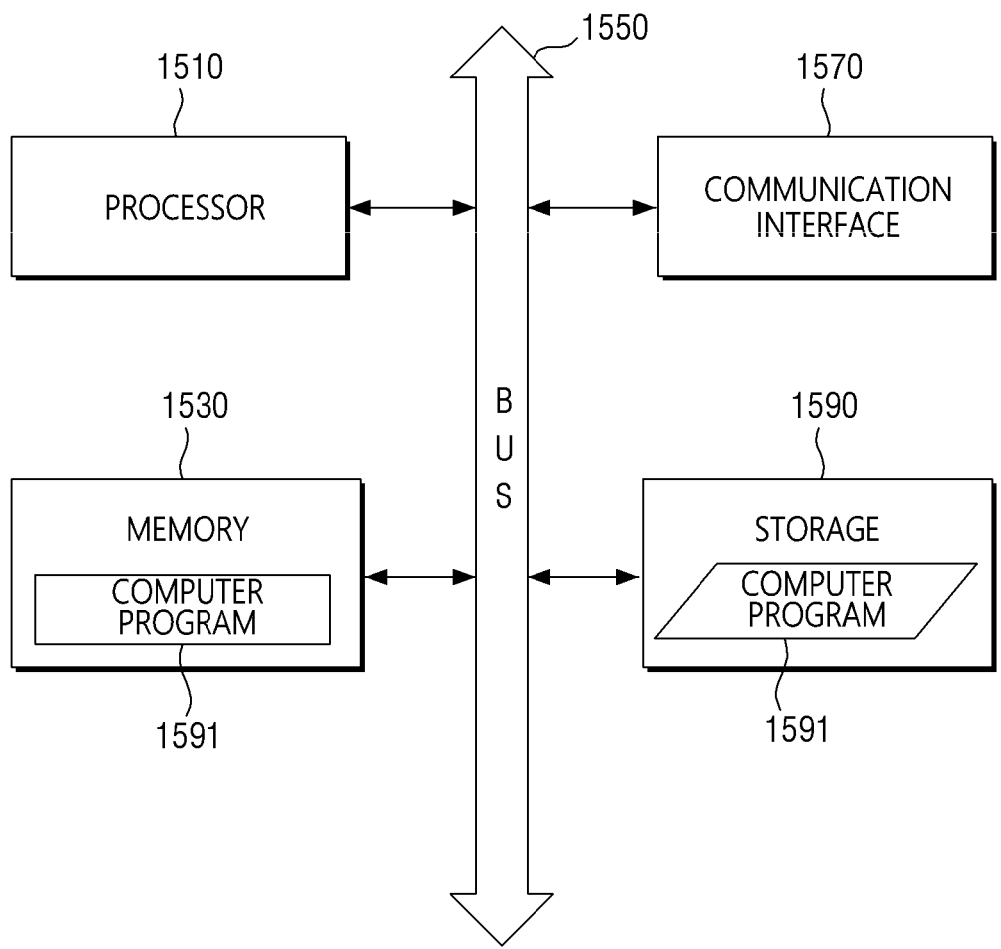
FIG. 15 is a diagram illustrating a computing device capable of implementing some configurations of an automated guided vehicle according to an embodiment of the present invention.

FIG. 15 is an example hardware diagram illustrating a computing device 1500.

As shown in FIG. 15, the computing device 1500 may include one or more processors 1510, a bus 1550, a communication interface 1570, a memory 1530, which loads a computer program 1591 executed by the processors 1510, and a storage 1590 for storing the computer program 1591. However, FIG. 15 illustrates only the components related to the embodiment of the present disclosure. Therefore, it will be appreciated by those skilled in the art that the present disclosure may further include other general purpose components in addition to the components shown in FIG. 15.

The processor 1510 controls overall operations of each component of the computing device 1500. The processor 1510 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 1510 may perform calculations on at least one application or program for executing a method/operation according to various embodiments of the present disclosure. The computing device 1500 may have one or more processors.

The memory 1530 stores various data, instructions and/or information. The memory 1530 may load one or more programs 1591 from the storage 1590 to execute methods/operations according to various embodiments of the present disclosure. For example, when the computer program 1591 is loaded into the memory 1530, the logic (or the module) as shown in FIG. 14 may be implemented on the memory 1530. An example of the memory 1530 may be a RAM, but is not limited thereto.

The bus 1550 provides communication between components of the computing device 1500. The bus 1550 may be implemented as various types of bus such as an address bus, a data bus and a control bus.

The communication interface 1570 supports wired and wireless internet communication of the computing device 1500. The communication interface 1570 may support various communication methods other than internet communication. To this end, the communication interface 1570 may be configured to include a communication module well known in the art of the present disclosure.

The storage 1590 can non-temporarily store one or more computer programs 1591. The storage 1590 may be configured to include a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 1591 may include one or more instructions, on which the methods/operations according to various embodiments of the present disclosure are implemented. When the computer program 1591 is loaded on the memory 1530, the processor 1510 may perform the methods/operations in accordance with various embodiments of the present disclosure by executing the one or more instructions.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although the operations are shown in a specific order in the drawings, those skilled in the art will appreciate that many variations and modifications can be made to the preferred embodiments without substantially departing from the principles of the present inventive concept. Therefore, the disclosed preferred embodiments of the invention are used in a generic and descriptive sense only and not for purposes of limitation. The scope of protection of the present inventive concept should be interpreted by the following claims, and all technical ideas within the scope equivalent thereto should be construed as being included in the scope of the technical idea defined by the present disclosure.

What is claimed is:

1. An automated guided vehicle for transporting a first object and a second object to a facility, comprising:
   a main body;
   a first shaft provided in the main body for loading the first object and the second object, the first shaft protruding from the main body to face a front direction of the main body and comprising a first loading unit for loading the first object and a second loading unit formed at a different position from the first loading unit for loading the second object;
   a camera provided at one end of the first shaft for photographing the front direction of the main body;
   a position adjustment module configured to decode an identifier when an image photographed by the camera includes the identifier displayed on the facility, and to use a result of the decoding to adjust a position of the one end of the first shaft; and a fixing unit for preventing objects loaded on the first shaft from falling when the objects are transported comprising a first fixing unit for fixing the first object loaded on the first loading unit and a second fixing unit for fixing the second object loaded on the second loading unit, wherein the first fixing unit is configured to fix the first object by combining with a fixing groove formed in the first object.

2. The automated guided vehicle of claim 1, wherein the position adjustment module is configured to decode the identifier to obtain the position of the one end of the first shaft, and an alignment position of a corresponding shaft of the facility, and adjust the position of the one end of the first shaft to be matched to the alignment position of the corresponding shaft.

3. The automated guided vehicle of claim 2, wherein the position adjustment module is configured to adjust the position of the one end of the first shaft to be matched to the alignment position, fix the position of the one end of the first shaft, and increase a height of the other end of the first shaft by a reference value.

4. The automated guided vehicle of claim 2, wherein the position adjustment module is configured to adjust the position of the one end of the first shaft to be matched to the alignment position, fix the position of the one end of the first shaft, and decrease a height of the other end of the first shaft by a reference value.

5. The automated guided vehicle of claim 1, further comprising:

a pusher for pushing an object loaded on the first shaft to move the object from the first shaft to the facility.

6. The automated guided vehicle of claim 5, wherein the pusher is configured to push the object loaded on the first shaft to move the object to the facility when the position of the one end of the first shaft is adjusted by the position adjustment module.

7. The automated guided vehicle of claim 5, wherein the facility comprises a first facility and a second facility; and the pusher is configured to push the first object loaded to the first shaft to move the second object to the first facility, and stop pushing the first object when the second object is moved to the first facility.

8. The automated guided vehicle of claim 1, wherein the second object is loaded on the second loading unit after the first object is loaded on the first loading unit.

9. The automated guided vehicle of claim 1, wherein the second fixing unit is configured to fix the second object by combining with the one end of the first shaft when the second object is loaded on the second loading unit.

10. The automated guided vehicle of claim 1, further comprising:

a sensor for detecting the number of the objects loaded on the first shaft.

11. The automated guided vehicle of claim 10, wherein a transport speed of the automated guided vehicle is decreased if the number of the objects is greater than or equal to a reference value; and the transport speed of the automated guided vehicle is increased if the number of the objects is less than the reference value.

12. The automated guided vehicle of claim 10, further comprising:

a pusher for pushing the objects loaded on the first shaft to move the objects from the first shaft to the facility, wherein an operation of the pusher is controlled to correspond to the number of the objects.

13. A system, comprising:

the automated guided vehicle of claim 1; and a facility comprising:

a first corresponding shaft and a second corresponding shaft having a height different from a height of the first corresponding shaft; and a height adjustment module for adjusting a height of the shaft according to the height of the first corresponding shaft and the height of the second corresponding shaft.

14. The system of claim 13, wherein the height adjustment module previously stores the height of the first corresponding shaft and the height of the second corresponding shaft.

15. The automated guided vehicle of claim 1, further comprising:

a second shaft provided in the main body to face a rear direction of the main body.

16. A method performed by a computing device for adjusting a shaft of an automated guided vehicle, the method comprising:

fixing objects loaded on the shaft to prevent the objects from falling when the objects are transported;

receiving an image photographed by a camera provided at one end of a shaft included in an automated guided vehicle;

decoding an identifier when the image includes the identifier; and adjusting a position of one end of the shaft by using a result of the decoding, wherein the fixing the objects comprises:

fixing a first object loaded on a first loading unit configured on the shaft by combining a first fixing unit with a fixing groove formed in the first object; and fixing a second object loaded on a second loading unit configured on the shaft and formed at a different position from the first loading unit using a second fixing unit.

\* \* \* \* \*